A. C. MAYERS.
NUT LOCK.
APPLICATION FILED JAN. 23, 1911.
1,031,654.
Patented July 2, 1912.
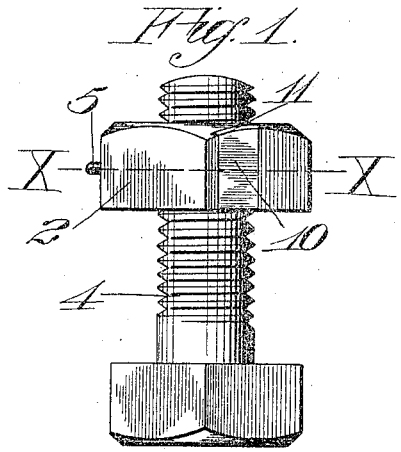
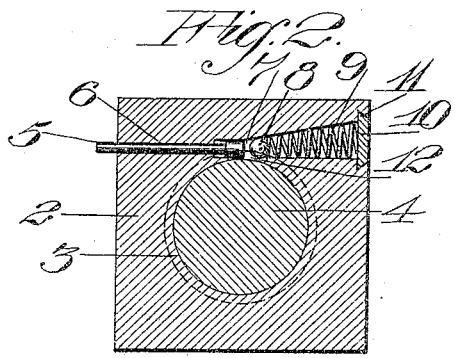
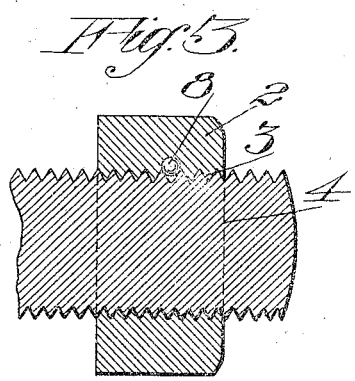
Witnesses
Thos. Cashberg
F. E. Maynard.
Inventor
Alfred C. Mayers
by G. H. Strong
his Atty.

UNITED STATES PATENT OFFICE.

ALFRED C. MAYERS, OF SALINAS, CALIFORNIA, ASSIGNOR TO D. C. DEMAREST, OF SAN FRANCISCO, CALIFORNIA.

NUT-LOCK.

1,031,654.      Specification of Letters Patent.      Patented July 2, 1912.

Application filed January 23, 1911. Serial No. 604,108.

*To all whom it may concern:*

Be it known that I, ALFRED C. MAYERS, citizen of the United States, residing at Salinas, in the county of Monterey and State of California, have invented new and useful Improvements in Nut-Locks, of which the following is a specification.

This invention relates to nut locks.

The object of this invention is to provide a simple, practical, inexpensive device for insuring the retention in position of a bolt and its nut under varying conditions; to provide a nut lock involving elements automatically operable to lock the nut in any degree of rotation of the same about the bolt on which it is mounted; to provide a nut lock having means whereby access may be had to the locking elements for the repair of the latter; and to provide a nut locking device so designed that it will be operable under conditions where the thread of the bolt has been greatly worn.

The invention consists of the parts and the combination and construction of parts as hereinafter more fully described and claimed, having reference to the accompanying drawings, in which—

Figure 1 is an outside view of the bolt and nut. Fig. 2 is a section on line X—X, Fig. 1. Fig. 3 is a cross-section of same.

The present invention comprises a nut 2, interiorly threaded, as at 3, to fit upon a bolt 4. The nut 2 is provided with a small plunger 5, projecting slightly from a side of the nut and reciprocal in a passageway 6, preferably arranged at a tangent to the threads of the nut, and which is enlarged to form a socket 7 to receive a ball 8, which is normally thrust inwardly by a spring or equivalent device 9, supported within the nut by a removable key-plate 10, mounted in a dove-tailed seat 11 formed in one of the sides of the nut 2.

In operation, the ball 8 projects into an opening 12 formed by the removal of a portion or section of a thread in the nut, the position of the ball being such that it will seat against the walls of the thread of the bolt or screw 4. When the nut 2 is applied to the end of the screw 4 and advanced thereon, the ball 8 will ride in the apex of the thread as the nut is turned, in this instance, to the right, and at the moment the movement of the nut about the bolt 4 has ceased, the spring 9 automatically thrusts the ball 8 into frictional binding engagement upon the adjacent angular walls of the thread, locking the nut upon the bolt. Preferably, the socket 7 within which the ball 8 is movable, is tapered to converge toward the plunger socket 6. The purpose of this convergence of the ball socket 7 is to cause the ball to move toward the body of the screw 4 if the threads upon the same wear away. The nut 2 cannot be unscrewed from the bolt 4 so long as the spring 9 is allowed to press the ball 8 into frictional engagement against the walls of the bolt thread, and in order to disengage the ball from locking engagement with the thread of the bolt, pressure must be applied to the projecting portion of the small plunger 5 to move the ball 8 backwardly in its socket, thus freeing it from the bolt 4, when the nut may then be freely unscrewed from the bolt. I have found that by slightly roughening the surface of the ball 8 it bites upon the bolt 4 with greater rapidity than would be the case if the surface of the ball were smooth. In the event that the plunger 5 should be damaged, or otherwise prevented from actuating the locking ball 8, the key-plate 10 can readily be removed from the nut 2 to expose the spring 9 and the ball 8, allowing the removal of these members and the nut 2.

Having thus described my invention, what I claim and desire to secure by Letters-Patent, is—

An improved nut lock, consisting of a nut adapted to fit a threaded bolt and having a pin guiding passage at right angles to its axis, said passage being enlarged at and intersecting with the threads of the nut and communicating with the conical diverging chamber extending to the opposite side of the nut, a removable cap covering the outer end of the conical chamber, an expansible spring bearing against said cap, a ball loosely fitting the last mentioned chamber and being directed against the threads of the bolt by the opposite inclined wall of the conical chamber, when acted upon by said spring, and a reciprocable pin projecting from the nut and engageable with said bolt.

In testimony whereof I have hereunto set my hand in the presence of two subscribing witnesses.

ALFRED C. MAYERS.

Witnesses:
G. H. STRONG,
JOHN H. HERRING.